June 12, 1956 R. W. SIMMONS 2,750,161
METHOD FOR STIRRING GLASS
Filed Aug. 5, 1952

INVENTOR.
RALPH W. SIMMONS
BY
Oscar L. Spencer
ATTORNEY

United States Patent Office 2,750,161
Patented June 12, 1956

---

2,750,161

METHOD FOR STIRRING GLASS

Ralph W. Simmons, Ford City, Pa., assignor to Pittsburgh Plate Glass Company, Allegheny County, Pa., a corporation of Pennsylvania Application August 5, 1952, Serial No. 302,690

2 Claims. (Cl. 259—6)

---

This invention pertains specifically to a method for removing inhomogeneities by stirring the glass within a relatively small confined space through which the glass is being continuously passed.

One object of the invention is to provide a method which circulates and repeatedly shears the glass to break up and attenuate inhomogeneities of the glass.

A further object of the invention is to provide a method which produces two intermingling rotating streams to further mix and attenuate inhomogeneities in the glass.

Figure 1:
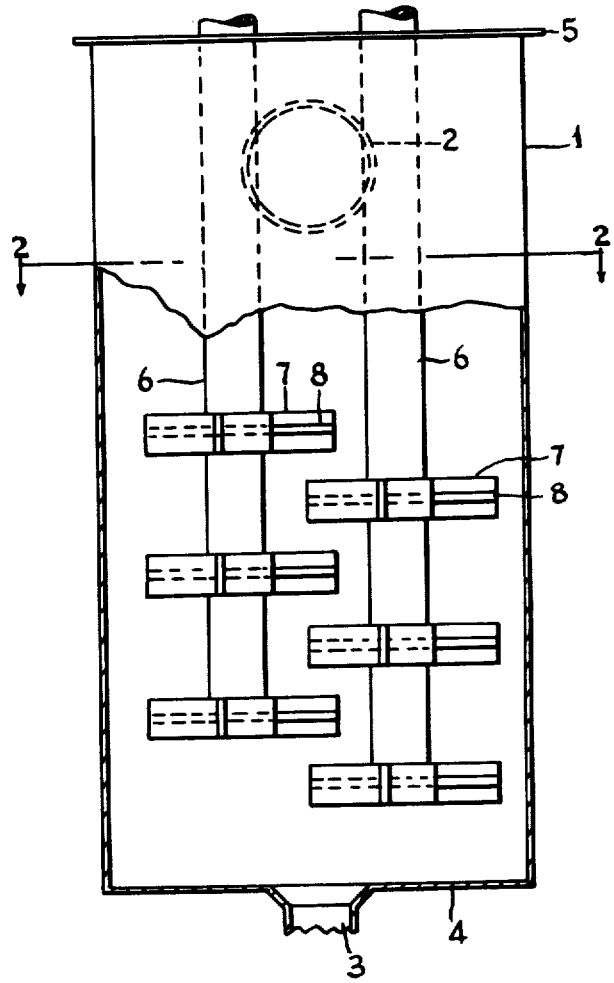
Figure 2:
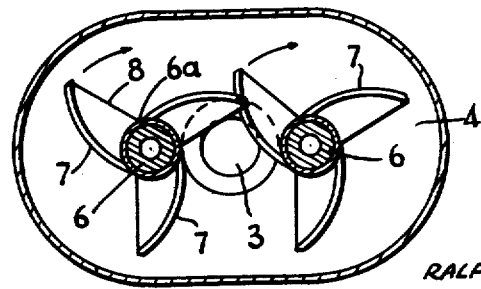

In the drawings forming part of this description, Fig. 1 shows in elevation the stirring device of the invention having a portion of the container wall broken away to show construction and arrangement of the stirring blades; Fig. 2 of the drawing shows a section taken on the lines 2—2 of Fig. 1 to illustrate further details of construction of the stirring devices and their relation within the container.

Referring now in detail to the drawings, reference character 1 indicates a substantially elliptical container having arcuate end walls connected by substantially flat side walls. An aperture 2 in one of the side walls adjacent the top of the container provides an inlet and an aperture 3 in a bottom wall 4 of the container 1 provides an outlet for passage of the glass through the container. Preferably the top of the container 1 is closed by a suitable top wall 5 which may be omitted if desired. Mounted within the container 1 are spaced stirring rods 6 which are preferably of similar construction and which pass through a suitable opening in the top wall 5. Suitable mechanism, not shown, will be provided for rotation of the stems 6 about their vertical axes. Mounted in spaced groups on stems 6 are arcuate blades 7 which are three in number to each group. These blades are spaced 120° about the periphery of each stem 6. Reinforcing each arcuate blade 7 and preferably disposed midway in the height of the blade is a reinforcing rib 8. As illustrated in Fig. 1 of the drawings, these groups of blades 7 are assembled on each rod 6 so that the individual groups on each rod are staggered relative to the groups on the adjacent rod and the bottom group is spaced about the bottom wall 4 of the container 1 as shown.

Various suitable ceramic materials may be used in forming the apparatus, provided such material does not spall or otherwise contaminate the molten glass at the high temperatures of operation. I prefer to make the container 1, stem 6, and blades 7 and 8 of platinum and, in order to reduce the cost thereof, I prefer to make the stems 6 of an interior ceramic core having a sheath of platinum 6a enclosing the core. In assembling the blades 7 and webs 8, which are also of platinum, I prefer to fasten these to the platinum sheath as by welding.

The molten glass contained within container 1 enters inlet 2 at a temperature of about 2300° and is maintained at a temperature above about 2000° for maximum stirring action. These temperatures, however, are subject to considerable variation depending upon the composition of the glass and therefore are by way of illustration rather than limitation. In order to prevent undesired temperature differentials between the inlet 2 and outlet 3 any well-known method of insulating and supplying auxiliary heat to the container may be provided and are preferably used. These forms of insulation and auxiliary heat form no part of the present invention and for that reason have not been illustrated. It will suffice to say their use is recommended and the form and extent thereof will depend upon each particular installation.

It is well-known that glass at the temperature of operation of the device, mainly between 2000 and 2400° F., is a highly viscous liquid. As is well-known in the art, viscosity is that property of a fluid by which it resists deformation. Therefore, turbulencies and disturbances which may be set up by the rotating blades in a fluid of low viscosity such as water would be apt to continue in the fluid for a much longer period than in a fluid such as molten glass of higher viscosity. The purpose of stirring molten glass is to remove or eliminate inhomogeneities by either attenuation or repeated shearing. The present invention is, therefore, concerned with both attenuation and shearing and, at the same time, a complete mixing of the fluid so as to avoid having any such inhomogeneities pass through the container 1 without being acted upon by the stirring devices.

In the operation of the device, molten glass is admitted into the container 1 through inlet 2 and passes out of the container through outlet 3. The relative rates of flow at the inlet and outlet are regulated so that the container during operation is maintained substantially full of molten glass at least to adjacent the height of the inlet 2 and in all cases to a height above blades 7 sufficient to avoid introduction of air into the glass during the stirring operation. The blades 7 and rods 6 may be rotated in either direction. I prefer to rotate them in a clockwise direction as indicated in Fig. 2 of the drawings. If the container 1 were closed, rotation of the blades 7 would set up a circular motion of the fluid within the container about each set of blades 7. By reason of the glass continuously flowing through the container, this circular motion is maintained but instead of continuing in a common plane follows a generally spiral path.

In other words, there are three main force components provided to move the molten glass within the mixing chamber. These components produce vertical movement from inlet orifice 2 to outlet orifice 3, rotational motion about the inner periphery of the container 1 due to the clockwise rotation of both blades 7, and substantially circular motion of the molten glass throughout the volumes defined by the rotation of the individual sets of blades 7 mounted upon each rotatable rod 6.

The resultant of these forces constitutes a generally helical motion of all the glass, wherein different portions of the glass are repeatedly displaced from the main helical stream toward the central portion of the mixing chamber at various levels therewithin. Since the stems 6 both turn in the same direction and the groups of blades on each stem are arranged in staggered relation, it will be apparent there will be a volume of turbulence and shear in the central portion of the mixing chamber between the two stems 6 wherein the movement of the blades overlaps.

In this zone of turbulence, successive portions of displaced glass are subjected to random motions created by the reverse motions of the overlapping blades in this region. The molten glass within this turbulent zone is sheared and attenuated by the reverse vertical motions set up therewithin in the central portion of the chamber, thereby providing efficient mixing through both attenuation and shear of any homogeneities present.

The continued rotation of the blades 7 restores previously displaced portions of glass to the main helical stream and continually displaces other portions of molten glass from the main stream to the central zone of turbulence. During the course of flow of an individual portion of glass from the inlet 2 to the outlet 3, it is displaced from and replaced into the main stream of glass flow many times, thus affording many opportunities for the individual portions of glass to be attenuated and sheared by the random movements imparted to the glass at the central portion of the chamber. The blades are preferably rotated at a speed of between 40 to 50 R. P. M.

By experimentation it has been established that optical grade glass, of a composition referred to as crown glass, with a rate of through-put of 100 pounds per hour has been satisfactorily homogenized by a speed of rotation of the blades between 40 and 50 R. P. M. With heavier glasses, sometimes referred to as the flint type optical glasses, the same speed of rotation will produce about 50 pounds per hour through-put of the container.

It is, therefore, to be understood that I desire to place no limitation on my invention by any specific recital of rate of glass flow through the container 1 or speed of rotation of the blades. The more viscous liquids such as the flint type glasses can have an increased through-put per hour by increasing the speed of rotation of the blades.

I claim:

1. The method of stirring glass comprising the steps of, continuously flowing molten glass by gravity through a container at a rate to maintain the container substantially filled, imparting a generally circular motion to the glass about the inner periphery of the container, establishing horizontally spaced vertical zones of rotary mechanical movement to the glass within the generally circular movement of the glass and repeatedly shearing the glass between the two spaced zones.

2. A method of stirring glass moving vertically and continuously through a container comprising the steps of, feeding molten glass into the container at a rate to maintain the container substantially uniformly filled, imparting a generally spiral path to the movement of the body of glass through the container, and mechanically displacing portions of the glass from the main stream of flow to create random movement of displaced portions of glass within the main stream of flow of glass.

References Cited in the file of this patent

UNITED STATES PATENTS

| 976,363 | Hinkhouse | Nov. 22, 1910 |
| 1,498,286 | Marsh | June 17, 1924 |
| 2,569,459 | De Voe | Oct. 2, 1951 |
| 2,570,079 | Spremulli | Oct. 2, 1951 |

FOREIGN PATENTS

| 371,190 | Great Britain | Apr. 21, 1932 |
| 41,254 | France | Aug. 30, 1932 |

Dedication 2,750,161.—*Ralph W. Simmons*, Ford City, Pa. METHOD FOR STIRRING GLASS. Patent dated June 12, 1956. Dedication filed July 25, 1973, by the assignee, *PPG Industries, Inc.*

Hereby dedicates the remainder of its term to the free use and benefit of the People of the United States.

[*Official Gazette December 25, 1973.*]